United States Patent [19]

Takahashi

[11] Patent Number: 4,887,164

[45] Date of Patent: Dec. 12, 1989

[54] IMAGE DATA COMMUNICATION APPARATUS HAVING AN IMAGE DATA MEMORY

[75] Inventor: Masamoto Takahashi, Tokyo, Japan

[73] Assignee: Canon Kabushiki Kaisha, Tokyo, Japan

[21] Appl. No.: 239,314

[22] Filed: Sep. 1, 1988

[30] Foreign Application Priority Data

Sep. 16, 1987 [JP] Japan ................................ 62-229667

[51] Int. Cl.$^4$ ............................................. H04N 1/40
[52] U.S. Cl. .................................... 358/443; 358/252; 364/514; 379/100
[58] Field of Search ....................... 358/280, 256, 257; 379/100; 364/514

[56] References Cited

U.S. PATENT DOCUMENTS

| | | | |
|---|---|---|---|
| 4,386,373 | 5/1983 | Kondo | 358/257 |
| 4,463,417 | 7/1984 | Bushaw | 379/100 |
| 4,581,656 | 4/1986 | Wada | 358/257 |
| 4,587,633 | 5/1986 | Wang | 364/514 |
| 4,646,160 | 2/1987 | Iizuka | 358/257 |
| 4,688,108 | 8/1987 | Cotton | 358/257 |
| 4,823,193 | 4/1989 | Takahashi | 358/257 |
| 4,829,385 | 5/1989 | Takezawa | 358/280 |

Primary Examiner—Howard W. Britton
Attorney, Agent, or Firm—Fitzpatrick, Cella, Harper & Scinto

[57] ABSTRACT

Image data communication apparatus of the facsimile type in which an image memory is arranged to store image signals and a program memory is arranged to cause the apparatus to carry out several programs in a time sharing sequence. One of the programs controls an operation of the communication apparatus using the image memory and this program is given priority over the others in accordance with the available storage capacity in the image memory.

25 Claims, 5 Drawing Sheets

IMAGE DATA COMMUNICATION APPARATUS HAVING AN IMAGE DATA MEMORY

BACKGROUND OF THE INVENTION

1. Field of the Invention

The present invention relates to an image data communication apparatus, and more particularly to an image communication apparatus having an image data memory.

2. Description of the Related Art

Facsimile apparatus is known which has an image memory for storing image data to be sent and received. The image memory is used for various purposes, such as: matching communication speed and printing speed or reading speed, maintaining communication data secret in private communications, temporarily storing image data for timer activated transmission, etc.

It is also well known, in computer technology, to provide parallel processing or multi-task processing to simultaneously process a plurality of tasks.

However, multi-task processing has not been applied to facsimile systems because of its cost and because of its inability to provide security in communication. For example, conventional apparatus cannot read originals (for subsequent timer activated transmission) while simultaneously printing an image which is being received.

The conventional apparatus can only accept timer activated transmission and can feed originals to a reading unit, but the conventional apparatus does not read the originals simultaneously.

Facsimile operations should be secure so that even if someone removes an original image from the apparatus, the apparatus should be able to do the above-described processing.

Multi-task processing, e.g., receiving and printing, or reading and storing require a plurality of high speed processors and an image memory having a large capacity.

For example, the receiving side of a facsimile apparatus has to guarantee a line receiving speed at least as great as the speed to which the sending side was set in a pre-transmission procedure. In other words, the receiving side can not delay the receiving process time. Accordingly, it has been necessary to provide a plurality of processors which process simultaneously; and consequently the cost of the apparatus becomes extremely large.

Alternatively, the sending side can be made to delay or change the sending speed but this must be done by adding fill bits having no valid data.

SUMMARY OF THE INVENTION

It is an object of the present invention to overcome the above-described shortcomings of conventional image communication apparatus.

It is another object of the present invention to effectively use an image memory whose capacity is limited so that it does not overflow while a plurality of processes (one being related to use of the image memory), are carried out in parallel.

According to one feature of the present invention, a plurality of programs, one of which is related to using the image memory, are processed in parallel with a control processor which processes a plurality of programs in a time sharing sequence.

According to another feature of the present invention, a plurality of processes, one of which is related to a process for processing image data in an image memory, are processed in parallel, and this one process is given priority over the other processes in accordance with a remaining amount of available storage capacity in the image memory.

The present invention, in aspect thereof, involves a novel image data communication apparatus which comprises communication means for performing at least one of an image data sending operation and an image data receiving operation, an image memory for storing image data communicated by the communication means, a program memory for storing a plurality of programs including a first program which controls an operation of the communication means using the image memory and a second program which is different from the first program, and a control processor for processing both the first program and the second program in a time sharing control sequence. In preferred arrangements the time sharing sequence is arranged such that the image memory does not overflow and the time sharing sequence is arranged such that priority is given to the first program in accordance with the remaining amount of available storge capacity in the image memory.

According to another aspect of the present invention, there is provided an image communication apparatus which comprises communication means for performing at least one of an image data sending operation and an image data receiving operation, an image memory for storing received image data and control means arranged to cause the communication means to carry out a plurality of processes including a communication process in which the image data in the image memory is processed for communication and another process which is different from the communication process, the communication means being arranged such that the communication process is given priority over the other process in accordance with a remaining amount of available storage capacity in the image memory.

According to a further aspect, the present invention involves a novel method of processing image data in an image data communication apparatus. This novel method comprises the steps of causing the communication apparatus to perform at least one of an image data sending operation and an image data receiving operation, controlling at least two operations of the communication apparatus according to first and second programs, respectively, in a time sharing sequence, at least one of the programs including the step of transferring image data information between an image data memory and another portion of the communication apparatus.

The foregoing summary of certain more important features of the invention is provided in order that the detailed description of the preferred embodiments thereof that follows may be better understood, and in order that the present contribution to the art may be better appreciated. There are, of course, additional features of the invention that will be described in that detailed description with reference to the accompanying drawing. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENTS

Figure 1:
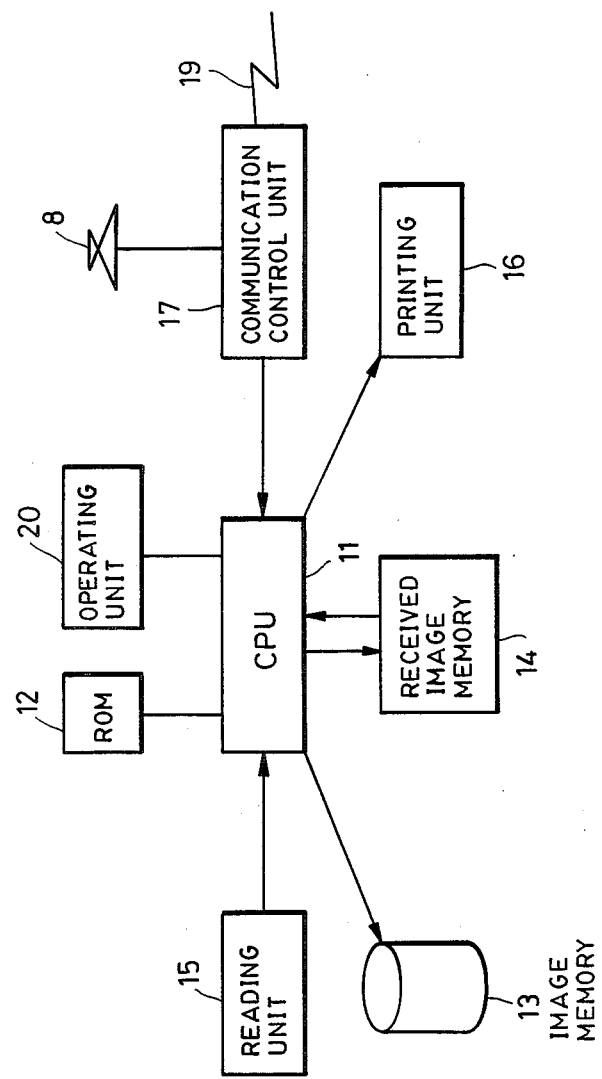
FIG. 1 is a block diagram of a facsimile apparatus according to a first embodiment of the invention.

The facsimile apparatus represented in FIG. 1 includes a CPU 11 of known construction and comprising a microprocessor device, a random access memory and other standard components for providing overall control of the apparatus. The CPU 11 is connected via data and address busses 10 to a plurality of memories and other units which are described in detail below.

One of the units connected to the CPU 11 is a ROM 12 for storing a control program and constants which are required for controlling the operation of the apparatus. An image memory 13 is also connected to the CPU 11. This image memory comprises a semiconductor random access memory or a magnetic hard disc memory; and it temporarily stores image data to be transmitted or copied. A received image memory 14 is also connected to the CUP 11 and serves to store only received image data. The memory 14 is provided for parallel processing of image receiving and other instructions, e.g., for reading originals for timer activated transmission. A reading unit 15, which may comprise a CCD (charge coupled device) sensor, or other image sensing transducer, is also connected to the CPU 11. The reading unit 15 reads originals and generates image data from the originals. A printing unit 16, which may comprise an inkjet printer, a thermal printer, an electrophotographic printer, etc., is also connected to the CPU 11 and serves to print out the received image data as well as the image data read by the reading unit 15 during a copying mode.

A communication control unit 17 is also connected to the CPU 11 to control transmission and reception of image data. The communication control unit 17 includes a MODEM for modulating and demodulating image data and program instruction signals and a network control unit (NCU) for controlling connection between a telephone line 19 and a telephone 8 or the MODEM. The NCU also serves to retain a communication loop and to carry out other related functions.

An operation unit 20 is also connected to the CPU 11 and serves to permit input and display of information relating to the operation of the apparatus. The operation unit 20 has a keyboard, including a 10-key unit, and a display unit, e.g., a liquid crystal display.

Figure 2:
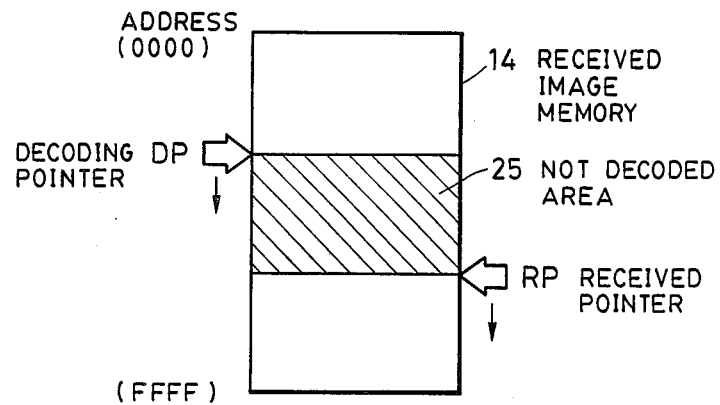
FIG. 2 is a memory map of a received image memory used in the apparatus of FIG. 1.

The received image memory 14 is arranged according to the memory map as shown in FIG. 2. Received image data which has not yet been decoded is stored in sequence in the image memory 14 from a starting address "0000" (the upper portion of FIG. 2) to an end address.

The received image data in the received image memory 14 may be coded in the MH (Modified Huffman) code, the MR (Modified READ) coded or other code used in image data transmission.

The CPU 11, or a decoding unit specially or separately installed in the CPU 11, decodes stored image data from the image memory 14 in parallel with the storage of received image data in the memory. The stored image data is read out from the received image memory 14 for decoding in the CPU 11 in the same sequence that it is stored in the memory 14 at the time of reception.

The CPU 11 uses two pointers for controlling the storage in and readout from the memory 14. One of these pointers is called a receiving pointer RP; and it identifies the last address of the area in the memory in which received image data was stored. The other pointer is called a decoding pointer DP; and it identifies the last address of the area in the memory from which image data is read out for decoding. These two pointers DP and RP are set in registers or memories in the CPU 11, and they are renewed or incremented according to software instructions as the image data decoding and receiving procedures advance. The area of the memory 14 having slanted lines represents a not decoded area 25 in which the received image data not yet decoded is stored. Accordingly, the image data in the not decoded area 25 is preserved from being deleted. The remainder of the memory 14, namely the rest area, is available for storing successively received image data; that is, any information in this remaining rest area can be deleted and newly received image data can be stored therein.

It should be noted that when either of the two pointers DP and RP reach the end address, i.e. "FFFF", it automatically returns to the starting address "0000", or to the starting address of the rest area.

The above described memory procedure is well known as the FIFO (First In First Out) procedure.

If the speed of the decoding procedure is slower than that of the receiving procedure, the not decoded area 25 becomes larger and the difference between RP and DP is increased. Accordingly RP should not overtake DP, otherwise the memory will become overloaded and information will be lost.

On the other hand, if the speed of the decoding procedure is faster than that of the receiving procedure, the not decoded area 25 becomes smaller, and the difference between RP and DP is decreased. Accordingly, DP should not overtake RP. In summary, RP and DP should move at predetermined rates within the memory 14.

Figure 3:
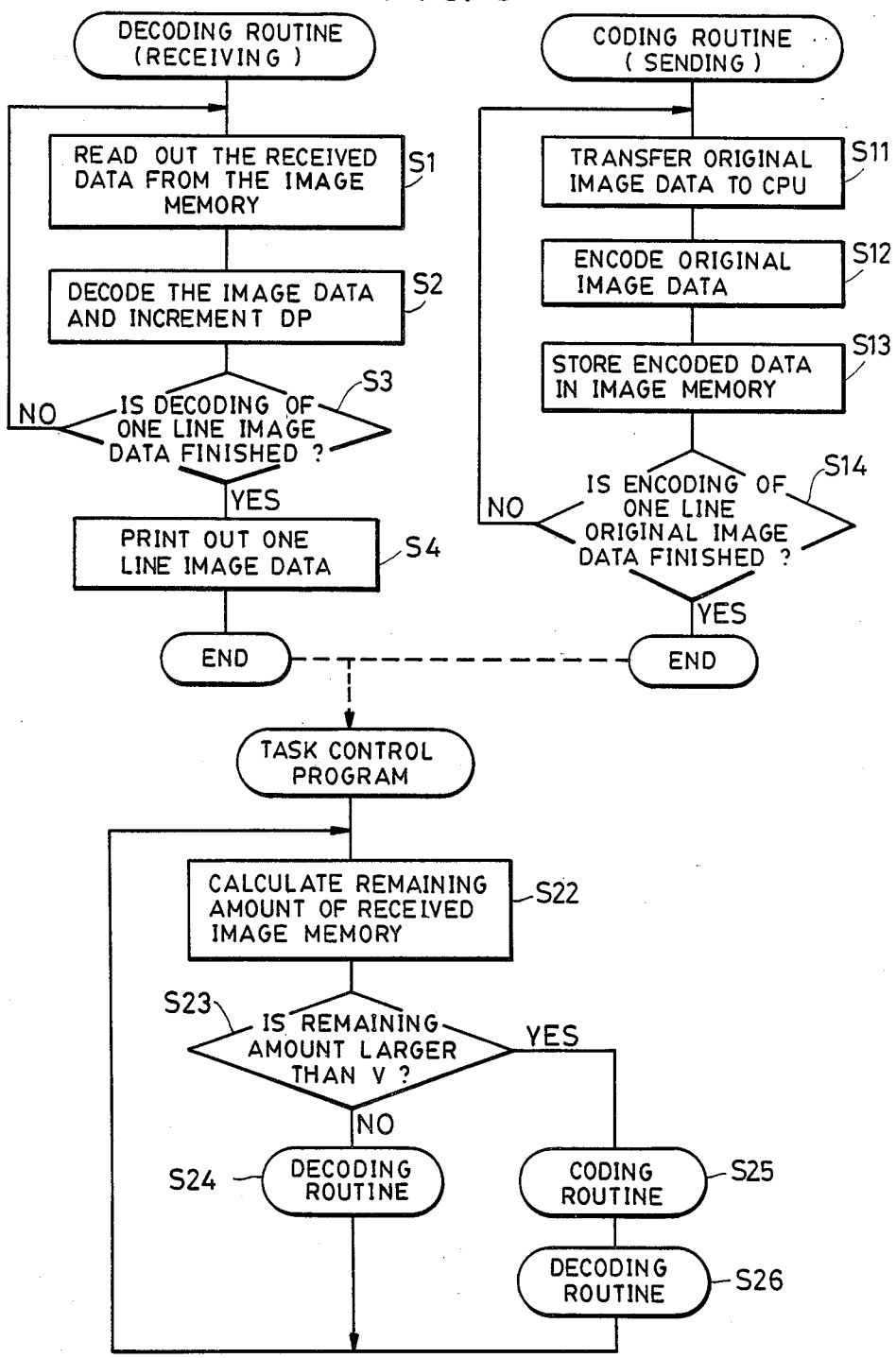
FIG. 3 is a flowchart illustrating processes carried out by a CPU in the first embodiment.

FIG. 3 is a flowchart showing a control program which is stored in the ROM 12.

The control program represented in FIG. 2 includes, as a subprogram, a decoding routine which carries out decoding of the received image data and printing of the decoded image signal in a receiving operation. The control program also includes, as another subprogram, a coding routine which carries out encoding of image signals from the reading unit 15 to coded signal format and which stores the coded signals in the image memory 13 in a sending operation. Both the decoding subroutine and the coding subroutine are processed alternatively in a time sharing arrangement according to a task control program which selects and changes both the sub-programs, as shown in a lower part of FIG. 3.

Accordingly, a microprocessor which is able to carry out a plurality of tasks in a time sharing method is provided in the CPU 11. This kind of microprocessor is well known.

The decoding routine is carried out as follows. The receiving operation is started in response to detection of a calling signal or another instruction signal from the sending side.

The received image signal is demodulated by the MODEM in the communication control unit 17, and the demodulated received image data is stored in undecoded format the received image memory 14. A decoding and printing procedure is then carried out according to steps S1 through S3.

In the step S1, the received image data is read out from the received image memory 14 one byte at a time. In the step S2, the received image data is decoded and the decoding pointer DP is incremented by an amount corresponding to one byte. In the step S3, a check is made as to whether the image data of one line has been decoded or not. If the image data of one line has been decoded the program proceeds to a step S4 in which the decoded image data of one line is printed by the printer unit 16. If the image data of one line has not been decoded the program returns to the step S1 and succeeding image data is decoded. After the step S4, the next sub-routine is selected. Thus, the decoding sub-routine is carried out for each line of the received image data.

The coding subroutine is carried out as follows. The CPU 11 causes the reading unit 15 to read the originals that have been set in the reading unit 15; and in a step S11, the CPU 11 transfers the read image data to the CPU 11 from the reading unit 15. Then the CPU 11 proceeds to a step S12 in which it encodes the image data from the reading unit 15. In a following step S13, the encoded image data is stored in the image memory 13.

The processes of the steps S11 through S13 are repeated until one line data of the original image has been read and stored in the image memory 13. After the data of the original image has thus been coded, the next sub-routine is selected in the task control program.

The coding sub-routine is carried out for every one line as in the case of the decoding sub-routine.

The task control program enables the apparatus to carry out both the above described receiving and sending operations in parallel.

In a step S22, the remaining amount of the rest area (i.e., other than the not decoded area of the received image memory 14) is calculated or detected in accordance with the values of the decoding pointer DP and the receiving pointer RP.

In a step S23, it is ascertained whether the remaining amount obtained in the step S22 is larger than a predetermined value V. The predetermined value V is determined in accordance with a characteristic of the facsimile apparatus, namely average processing time of one line in coding, transmission speed, and average processing time of one line decoding.

If the remaining amount of the rest area of the memory 14 is determined in the step S22 to be less than the predetermined value V, a step S24 is carried out. The step S24 is the above-described decoding sub-routine. Thus, when the remaining amount of the received image memory is not enough to continuously store the received image data, the coding sub-routine is temporarily inhibited; and only the decoding sub-routine is repeated.

If the remaining amount of the rest area in the received image memory 14 is determined in the step S22 to be more than the determined value V, steps S25 and S26 are carried out alternatively. The step S25 is the above-described coding sub-routine, and the step S26 is the decoding sub-routine. Thus, if the remaining amount of the rest area in the memory 14 is enough to continue storing received image data, the sending and receiving operations are carried out alternately. Accordingly, while coding is carried out in the step S25, received data is stored in the received image memory 14 without reading out from the memory 14. Therefore the receiving pointer RP is incremented, but the decoding pointer DP is not incremented during the step S25. In other words the remaining amount in the rest area of the memory is reduced during the step S25.

After the step 25, the decoding sub-routine is carried out, and the decoding pointer DP is incremented. In the illustrated embodiment the receiving pointer RP may be incremented by a timer in the CPU 11, because the speed at which the image signal is received is constant.

As described above, in accordance with the remaining amount of the rest area in the received image memory, a time sharing of the receiving and sending operations is obtained. Accordingly, without overflowing of the received image memory the decoding and printing procedure of the receiving operation and the coding procedure of the sending operation can be carried out in parallel.

The above-described embodiment, makes it possible without increase in cost or size of the apparatus (e.g., numbers of microprocessors and capacity of image memory), to carry out the receiving and the sending operations in parallel merely by providing appropriate software.

In the above embodiment, during the receiving operation, the original image signal is read and the read image signal is encoded for sending in parallel.

However, parallel processing operations are not restricted only to the receiving operation. For example, it may be desired to carry out a reading operation for reading the originals for copying by the printing unit 16 during the receiving operation. Further, if the communication control unit 17 accommodates a plurality of telephone or communication lines, then during the receiving operation on one line, the encoded image data can be transmitted on another line, via the CPU.

It should be noted in connection with the above described first embodiment, that when only one of the receiving operation or the sending operation is selected or instructed by an operator, it is natural that one of the decoding and printing procedure or the coding procedure is repeated to the end. In the first embodiment, the control program in FIG. 3 selects the decoding and the coding sub-routine for each line of the image data.

The second embodiment, which is described below, carries out each operation not on a line by line basis but instead for predetermined periods of time.

Figure 4:
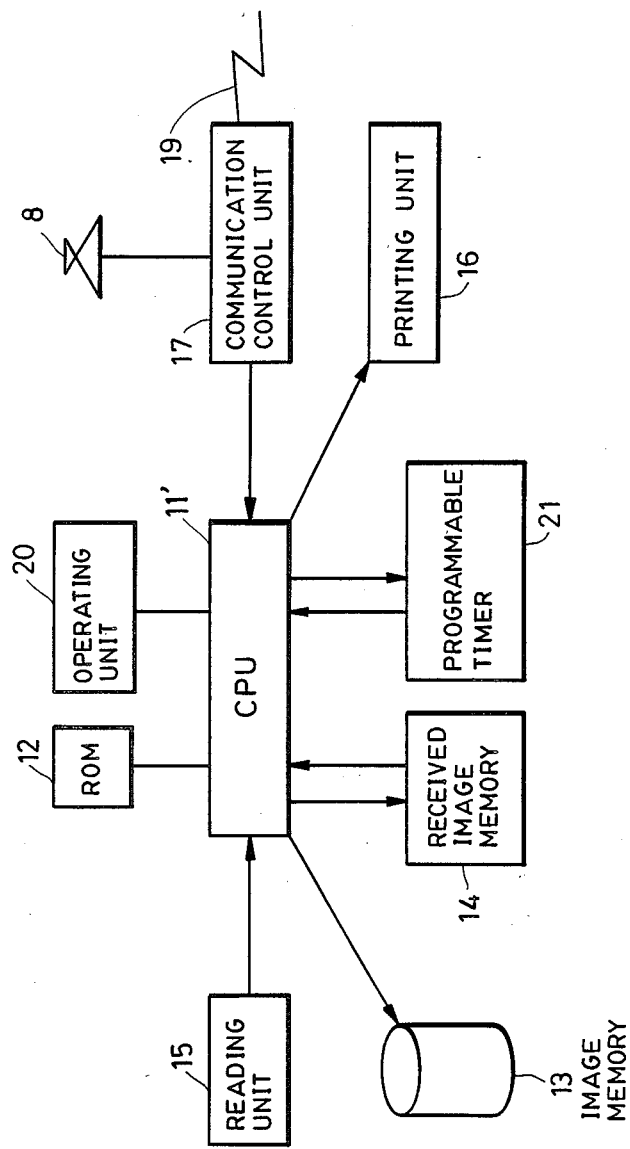
FIG. 4 is a block diagram of a facsimile apparatus according to a second embodiment of the invention.

FIG. 4 shows a block diagram of a facsimile apparatus according to the second embodiment of the present invention.

The facsimile apparatus of the embodiment of FIG. 4 has a programmable timer 21, which sets a plurality of time durations for generating interrupting signals in order to change the program steps, not for every unit of image data (e.g. one line one page or a predetermined amount), but instead according to a predetermined time. This latter type of operation is advantageous because the rate at which the image signal is received is constant whereas the decoding rate is random.

In the second embodiment, programmable timers are built into the CPU 11' which also has an interrupt function. Therefore hardware of the apparatus does not become large. This type of CPU is well known.

Other parts of the apparatus are as same as that of the first embodiment and only the software or program routine is different.

Figure 5:
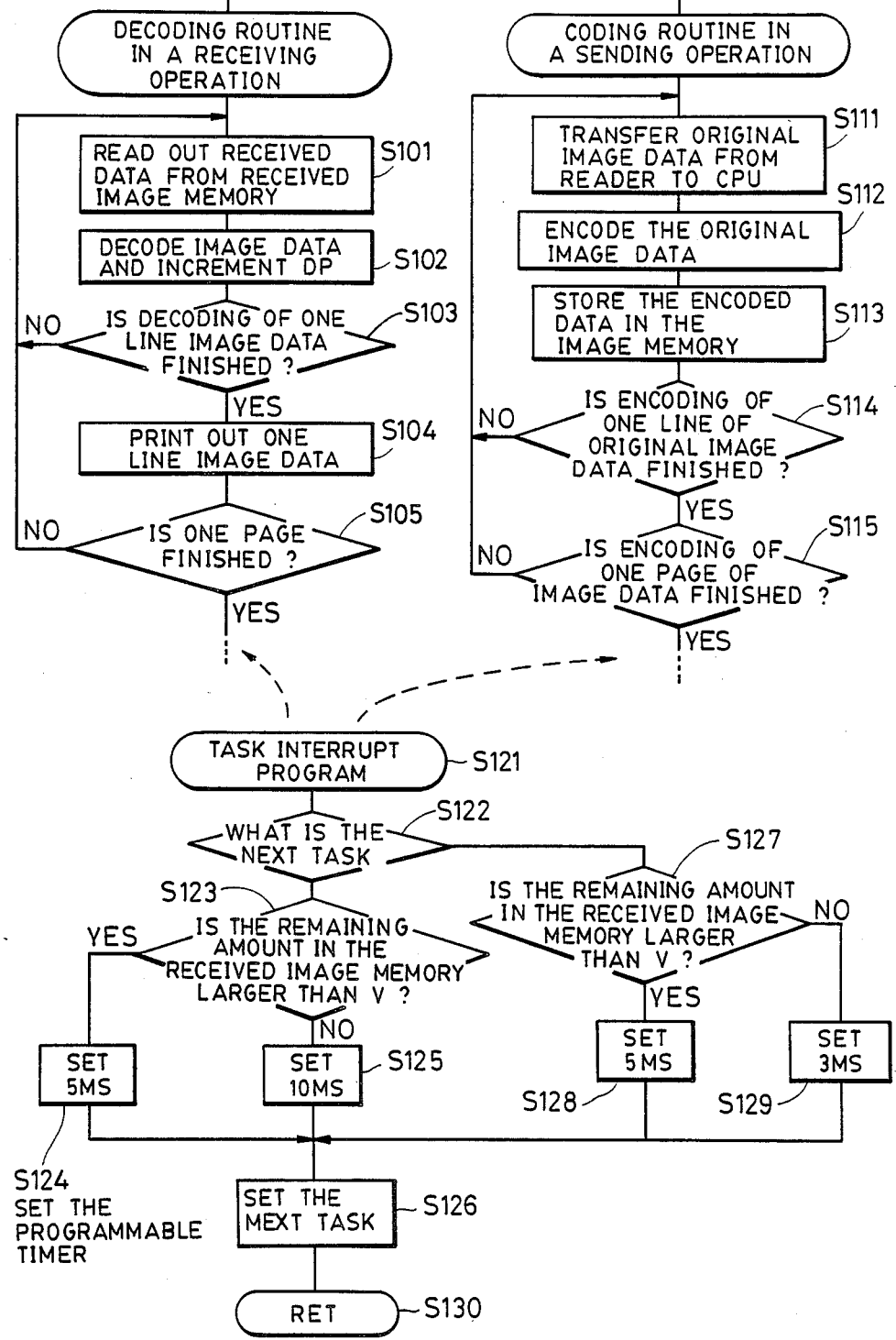
FIG. 5 is a flow chart illustrating processes carried out by a CPU in the second embodiment.

The operation of the second embodiment is explained as follows with reference to the flowchart of FIG. 5. A decoding task and a coding task are as same as the decoding sub-routine and the coding sub-routine of the first embodiment.

However, the various tasks or operations are initiated, not in response to each line of image data, but instead in response to interrupting signals which occur at predetermined times.

After the CPU 11' carries out a step S102 of the decoding task, namely, to decode the image data, the CPU 11' carries out a task interrupt program.

In the task interrupt program, the next operating routine or task is determined in a step S122. Thus, if the CPU has carried out a decoding task as the former operating task, the next operating task will be the coding task. On the other hand, if the CPU 11' has carried out a coding task just before the interrupt signal, the next operating task will be the decoding task. In this case, since the former task was the decoding task, the program is advanced to a step S127. In the step S127, a determination is made as to whether the remaining amount of the received image memory 14 is more than the predetermined amount V or not. If the remaining amount is less than the predetermined amount V, the timer interval of the programmable timer 21 is set to 3 ms (millisecond).

Then in a step S126, the next task, in this case the coding task, is set. Thereafter, in a step S130, the program returned to the next task, i.e., the coding task.

If the coding task was interrupted after a step S112 was previously carried out, the coding task is then started from a step S113. The coding task is carried out for the 3 ms set in a step S129. When 3 ms has elapsed, the programmable timer 21 generates a new task interrupt signal and the CPU 11' starts the task interrupt program.

In this program, the time duration of the next decoding task is set.

In the step S122, the decoding task for the receiving operation is determined as the next task. Accordingly, in a step S123, the remaining amount of the received image memory 14 is compared with the predetermined amount V. If the remaining amount is less than the predetermined amount V, a relative long time, e.g. 10 ms, is set to the programmable timer 21 as the timer interval in the step S125. Then, in a step S126, the next decoding task is set. In a step S130, the program to be carried out is returned to a step S103 in the decoding and outputting task, because the former decoding task was interrupted after the step 102. Also, the decoding task is carried out for 10 ms set in the step S125. After 10 ms, the interrupt signal is generated from the programmable timer 21. Then the next task is determined to be the coding task.

As described above, the tasks are changed alternately by the interrupt signals. Also, the operating time of each task is determined by the remaining amount of the rest area of the received image memory 14.

If the remaining amount of the rest area of the received image memory is enough to continue receiving while carrying out reading for the sending operation, the operating time of the next coding task is set to a standard operating time, e.g. 5 ms, in the step S128 and the operating time of the next decoding task is also set to a standard operating time, e.g. 5 ms, in the step S124. Therefore both the decoding process and the coding process are promoted. On the other hand, if the remaining amount of memory rest area is not enough to continue the reading for the sending operation as well as the receiving operation, the operating time of the next coding task is set to a relatively short time, 3 ms shorter than the standard time, in the step S123; and the operating time of the next decoding task is set to a relative long time, e.g. 10 ms longer than the standard time, in the step S125. Accordingly, decoding process for the receiving operation is promoted for increasing the remaining amount of the rest areas of the received image memory 14 without overflowing the memory. The time duration for decoding is not constant, so that the second embodiment is better in this respect than the first embodiment.

As indicated above, in accordance with the remaining amount of the rest area of the received image memory, the apparatus ascertains the possibility for operating something other than the decoding process or the receiving operation; and the time interval is set in the programmable timer 21 to change the operating time of each task according to a time sharing control method. Accordingly, it is easy to design the facsimile apparatus and the control program. Also, the facsimile apparatus operates smoothly without overflowing the capacity of the received image memory.

In the first and second embodiments, the received image memory 14 is used only for storing the received image data and the image memory 13 is used only for sending or copying data other than that stored in the image memory. However, the received image memory and the image memory for sending or copying may be integrated in the image memory and may share spaces of the same memory.

The individual components illustrated by blocks in the drawings are well known and are not per se part of the invention nor does any particular construction thereof relate to the best mode for carrying out the invention. Likewise the manner in which programs are stored in the various memories is also well known and is not per se part of the invention.

The communication lines from the communication control unit may comprise not only telephone lines but may also comprise radiotelegraphy or computer bus lines, if they can communicate the image data.

In one aspect of the invention, the control means for controlling a plurality of processes in a time sharing method is not limited to a common processor. A plurality of processors can be used for a plurality of tasks or processes respectively.

It will be appreciated that the present invention can be applied to other image communication apparatuses than the apparatus generally called known as facsimile machines.

It will also be appreciated that the invention is not restricted to only decoding and coding or receiving and sending operations which are processed in parallel. For example, the present invention can be applied to copying and receiving, to copying and sending, or to a combination of more than three operations.

As stated above, the communication apparatus of the present invention having an image memory of limited capacity is capable of executing a plurality of processes in parallel without overflowing the image memory.

In one aspect of the present invention, when a plurality of procedures, including one which processes image data in the image memory are executed in parallel, one of the procedures is given priority over another in accordance with a remaining or available amount of the image memory. Therefor without overflowing the image memory, a plurality of procedures can be executed in parallel.

In another aspect of the present invention, a plurality of programs, one of which is related to using the image memory, are processed in parallel with a common control processor operating in a time sharing manner.

Therefor a plurality of processes can be executed in parallel without increasing the size of the hardware.

Although particular embodiments of the present invention are herein described in detail for purposes of explanation, various modifications thereof, after study of this specifications, will be apparent to those skilled in the art to which the invention pertains.

I claim:

1. An image data communication apparatus comprising communication means for performing at least one of an image data sending operation and an image data receiving operation; an image memory for storing image data communicated by said communication means; a program memory for storing a plurality of programs including a first program, which controls an operation of said communication means using said image memory, and a second program which is different from the first program; and, a control processor for processing both the first program and the second program in a time sharing control sequence.

2. An image data communication apparatus according to claim 1, wherein said control processor is arranged to process the first program and the second program in a time sharing sequence such that said image memory does not overflow.

3. An image data communication apparatus according to claim 2, wherein said control processor is arranged to change the first program and the second program in a time sharing sequence in accordance with a remaining amount of available storage capacity in said image memory.

4. An image data communication apparatus according to claim 1, further comprising means for generating interrupting signals for interrupting said control processor, said control processor being arranged to change the first program and the second program in response to the interrupt signals.

5. An image data communication apparatus according to claim 4, wherein said control processor is arranged to change the time duration between the interrupt signals in response to a remaining amount of available storage capacity in said image memory.

6. An image data communication apparatus according to claim 1, wherein said program memory contains said first program and wherein said first program is arranged to control a receiving operation which includes a process for storing received encoded image signals in said image memory and for decoding the received encoded image signals.

7. An image data communication apparatus according to claim 6, wherein said control processor is arranged to process the first and the second program in a time sharing sequence such that said image memory does not overflow with the encoded image signals.

8. An image data communication apparatus according to claim 7, wherein said control processor is arranged to change the first and the second programs in a time sharing control sequence in accordance with a remaining amount of arranged to control a said image memory.

9. An image data communication apparatus according to claim 6, wherein said program memory contains said second program and wherein said second program is arranged to control a reading operation for reading originals.

10. An image data communication apparatus according to claim 9, further comprising a memory arranged to store image data of the originals.

11. An image data communication apparatus according to claim 10, wherein said communication means is arranged to send image data from said memory following said reading operation.

12. An image data communication apparatus comprising communication means for performing at least one of an image data sending operation and an image data receiving operation; an image memory for temporarily storing received image data; and control means arranged to cause said communication means to carry out a plurality of processes including a communication process in which the image data in said image memory is processed for communication and another process which is different from the communication process; said control means further being arranged such that said communication process is given priority over the other process in accordance with a remaining amount of available storage capacity in said image memory.

13. An image data communication apparatus, according to claim 12, wherein said control means is arranged to cause said communication means to carry out a decoding operation for decoding received image data in a receiving operation.

14. An image data communication apparatus according to claim 13, further including a reader for reading original images and wherein said control means is also arranged to cause said communication means to carry out a reading process of said reader.

15. An image data communication apparatus, according to claim 14, wherein said control means is arranged to cause said communication means to carry out a receiving process and to give said receiving process priority over the reading process when the remaining amount of available storage capacity in said image memory is less than a predetermined amount.

16. An image data communication apparatus according to claim 14, further comprising a second image memory for storing image data on the originals, and wherein said control means is arranged to cause said communication means to carry out a transferring process for storing the original image data to said second image memory.

17. An image data communication apparatus according to claim 12, wherein said control means includes a common control processor which is arranged to process the communication process and the other process in a time sharing manner.

18. An image data communication apparatus according to claim 17, wherein said control processor is arranged to change said processes following the processing of each unit of image data.

19. An image data communication apparatus according to claim 17, wherein said control processor is arranged to change said processes following predetermined intervals of time.

20. An image data communication apparatus according to claim 19, wherein the control processor is arranged to vary said predetermined intervals of time in accordance with the remaining amount of available storage capacity in said image memory.

21. An image data communication apparatus according to claim 17, wherein said control processor is arranged to change both processes in response interrupting signals.

22. An image data communication apparatus according to claim 21, wherein said control processor is arranged to change the time interval between the interrupting signals in accordance with the remaining amount of available storage capacity in said image memory.

23. A method of processing image data in an image data communication apparatus, said method comprising the steps of causing said communication apparatus to perform at least one of an image data sending operation and an image data receiving operation, controlling at least two operations of said communication means according to first and second programs, respectively, in a time sharing sequence, at least one of said programs including the step of transferring image data information between an image data memory and another portion of said communication apparatus.

24. A method according to claim 23 wherein the step of controlling at least two operations is carried out such that said one operation is given priority over other operations according to the remaining amount of available storage capacity in said image memory.

25. A method according to claim 23 wherein the step of controlling at least two operations is carried out such that said image memory does not overflow.

* * * * *

UNITED STATES PATENT AND TRADEMARK OFFICE
CERTIFICATE OF CORRECTION

PATENT NO. : 4,887,164

DATED : December 12, 1989

INVENTOR(S) : MASAMOTO TAKAHASHI

It is certified that error appears in the above-identified patent and that said Letters Patent is hereby corrected as shown below:

ON THE TITLE PAGE,
AT [75] INVENTOR

"Masamoto Takahashi," should read --Masatomo Takahashi,--.

ON THE TITLE PAGE,
AT [56] REFERENCES CITED

U.S. Patent Documents,
"Bushaw" should read --Bushaw et al.--.
"Wang" should read --Wang et al.--.
"Iizuka" should read --Iizuka et al.--.
"Cotton" should read --Cotton et al.--.

COLUMN 3

Line 33, "CUP 11" should read --CPU 11--.

COLUMN 4

Line 52, "FIG. 2" should read --FIG. 3--.

COLUMN 8

Line 57, "called" should be deleted.

COLUMN 10

Line 3, "arranged to control a" should be deleted.

UNITED STATES PATENT AND TRADEMARK OFFICE
CERTIFICATE OF CORRECTION

PATENT NO. : 4,887,164
DATED : December 12, 1989
INVENTOR(S) : MASAMOTO TAKAHASHI         Page 2 of 2

It is certified that error appears in the above-identified patent and that said Letters Patent is hereby corrected as shown below:

COLUMN 11

Line 8, "response" should read --response to--.

Signed and Sealed this

Seventeenth Day of September, 1991

Attest:

HARRY F. MANBECK, JR.

Attesting Officer

Commissioner of Patents and Trademarks